(12) United States Patent
Yamashita et al.

(10) Patent No.: US 11,949,143 B2
(45) Date of Patent: Apr. 2, 2024

(54) COMMUNICATION DEVICE FOR VEHICLE

(71) Applicant: DENSO CORPORATION, Kariya (JP)

(72) Inventors: Takuya Yamashita, Kariya (JP); Toru Koike, Kariya (JP)

(73) Assignee: DENSO CORPORATION, Kariya (JP)

( * ) Notice: Subject to any disclaimer, the term of this patent is extended or adjusted under 35 U.S.C. 154(b) by 464 days.

(21) Appl. No.: 17/368,959

(22) Filed: Jul. 7, 2021

(65) Prior Publication Data

US 2021/0336318 A1 Oct. 28, 2021

Related U.S. Application Data

(63) Continuation of application No. PCT/JP2020/001903, filed on Jan. 21, 2020.

(30) Foreign Application Priority Data

Jan. 22, 2019 (JP) .................. 2019-008504
Jan. 15, 2020 (JP) .................. 2020-004402

(51) Int. Cl.
*H01P 1/30* (2006.01)
*H01Q 1/22* (2006.01)
*H01Q 1/32* (2006.01)
*H04W 4/46* (2018.01)

(52) U.S. Cl.
CPC .......... *H01P 1/30* (2013.01); *H01Q 1/22* (2013.01); *H04W 4/46* (2018.02)

(58) Field of Classification Search
None
See application file for complete search history.

(56) References Cited

U.S. PATENT DOCUMENTS

| 6,031,492 | A | 2/2000 | Griffin et al. | |
| 10,511,086 | B1* | 12/2019 | Thill | H01Q 1/2291 |
| 11,489,249 | B2* | 11/2022 | Sautter | H01Q 1/3275 |
| 2007/0176831 | A1 | 8/2007 | Lagnado et al. | |
| 2014/0062808 | A1* | 3/2014 | Kataoka | H01Q 1/40 343/713 |
| 2017/0302621 | A1 | 10/2017 | Kinoshita | |
| 2017/0317409 | A1* | 11/2017 | Ayatollahi | H01Q 21/28 |

FOREIGN PATENT DOCUMENTS

| CN | 101013337 A | 8/2007 |
| JP | 2016001791 A | 1/2016 |
| JP | 2017152810 A | 8/2017 |
| TW | M570001 U | 11/2018 |
| WO | WO-9748147 A1 | 12/1997 |
| WO | WO-2016047005 A1 | 3/2016 |

* cited by examiner

*Primary Examiner* — Anh Q Tran
(74) *Attorney, Agent, or Firm* — Harness, Dickey & Pierce, P.L.C.

(57) ABSTRACT

A communication device for vehicle includes a housing installed in a vehicle, a communication unit housed in the housing, and a heat dissipation component provided in a heat conductive state with the communication unit. The heat dissipation component has a heat dissipation portion configured to function as an antenna of the communication unit.

9 Claims, 9 Drawing Sheets

COMMUNICATION DEVICE FOR VEHICLE

CROSS REFERENCE TO RELATED APPLICATIONS

This application is a continuation application of International Patent Application No. PCT/JP2020/001903 filed on Jan. 21, 2020, which designated the U.S. and based on and claims the benefits of priority of Japanese Patent Application No. 2019-008504 filed on Jan. 22, 2019, and Japanese Patent Application No. 2020-004402 filed on Jan. 15, 2020. The entire disclosure of all of the above applications is incorporated herein by reference.

TECHNICAL FIELD

The present disclosure relates to a communication device for vehicle.

BACKGROUND

As a vehicle communication device, for example, a type installed on a roof of a vehicle and a type installed in a vehicle are provided, and miniaturization of these devices is required.

SUMMARY

An object of the present disclosure is to provide a vehicle communication device capable of reducing an overall size while arranging heat dissipation component that dissipate heat from a communication unit.

In a first aspect of the present disclosure, a communication unit is accommodated in a housing, and a heat dissipation component is provided in a heat conduction state with the communication unit. In this case, a heat dissipation portion of the heat dissipation component functions as an antenna of the communication unit.

In a second aspect of the present disclosure, an antenna is arranged in a housing and a heat dissipation portion of a heat dissipation component functions as an element of the antenna.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

In an assumable example, since a vehicle communication device is configured in a closed type, heat generation of a communication circuit accommodated in a housing becomes a problem. Therefore, a heat dissipation component is provided in the housing, and heat from the communication circuit is radiated to an outside through the heat dissipation component.

On the other hand, in recent years, for example, in a type of vehicle communication device installed on the roof of the vehicle, multi-functionality that adds functions such as vehicle-to-vehicle communication and road-to-vehicle communication is progressing. Due to such multi-functionality, the heat generation of the communication circuit accommodated in the housing increases, and the inside of the housing tends to become even hotter. Since communication performance may deteriorate in a high temperature environment, cooling the communication circuit has become a major issue.

In a vehicle communication device of a type installed on a roof of the vehicle, a part of heat dissipation component mounted inside the housing is exposed to the outside of the housing, and then a shade is placed above the heat dissipation component. By providing the structure, the heat dissipation performance of the heat dissipation component is improved.

However, in the heat dissipation structure, when the roof becomes hot due to an influence of sunlight irdissipation, the vehicle communication device receives heat from the roof and the communication circuit tends to become hot.

On the other hand, for example, in a case of a vehicle communication device installed in an instrument panel, it is installed directly under a windshield, and the communication circuit tends to become hot due to an influence of sunlight irradiation through the windshield.

In this way, in vehicle communication device, the communication circuit tends to become hot, so heat dissipation component for dissipating heat from the communication circuit are important, but antennas and antenna elements are arranged inside the housing, and it is difficult to reduce an overall size while arranging heat dissipation component.

An object of the present disclosure is to provide a vehicle communication device capable of reducing the overall size while arranging heat dissipation component that dissipate heat from the communication unit.

In a first aspect of the present disclosure, a communication unit is accommodated in the housing, and a heat dissipation component is provided in the heat conduction state with the communication unit. In this case, since the heat dissipation portion of the heat dissipation component functions as an antenna of the communication unit, it is possible to reduce the overall size while arranging the heat dissipation component.

In a second aspect of the present disclosure, since the antenna is arranged in the housing and the heat dissipation portion of the heat dissipation component functions as an element of the antenna, the overall size can be reduced while arranging the heat dissipation component.

Hereinafter, multiple embodiments will be described with reference to the drawings. In the multiple embodiments, functionally and/or structurally corresponding parts are given the same reference numerals.

First Embodiment

A first embodiment will be described with reference to FIG. 1 to FIG. 5. The first embodiment is characterized in that it is applied to, for example, a type of vehicle communication device installed on a roof of a vehicle. An antenna device can be mentioned as a communication device for a vehicle of this type.

Figure 3:
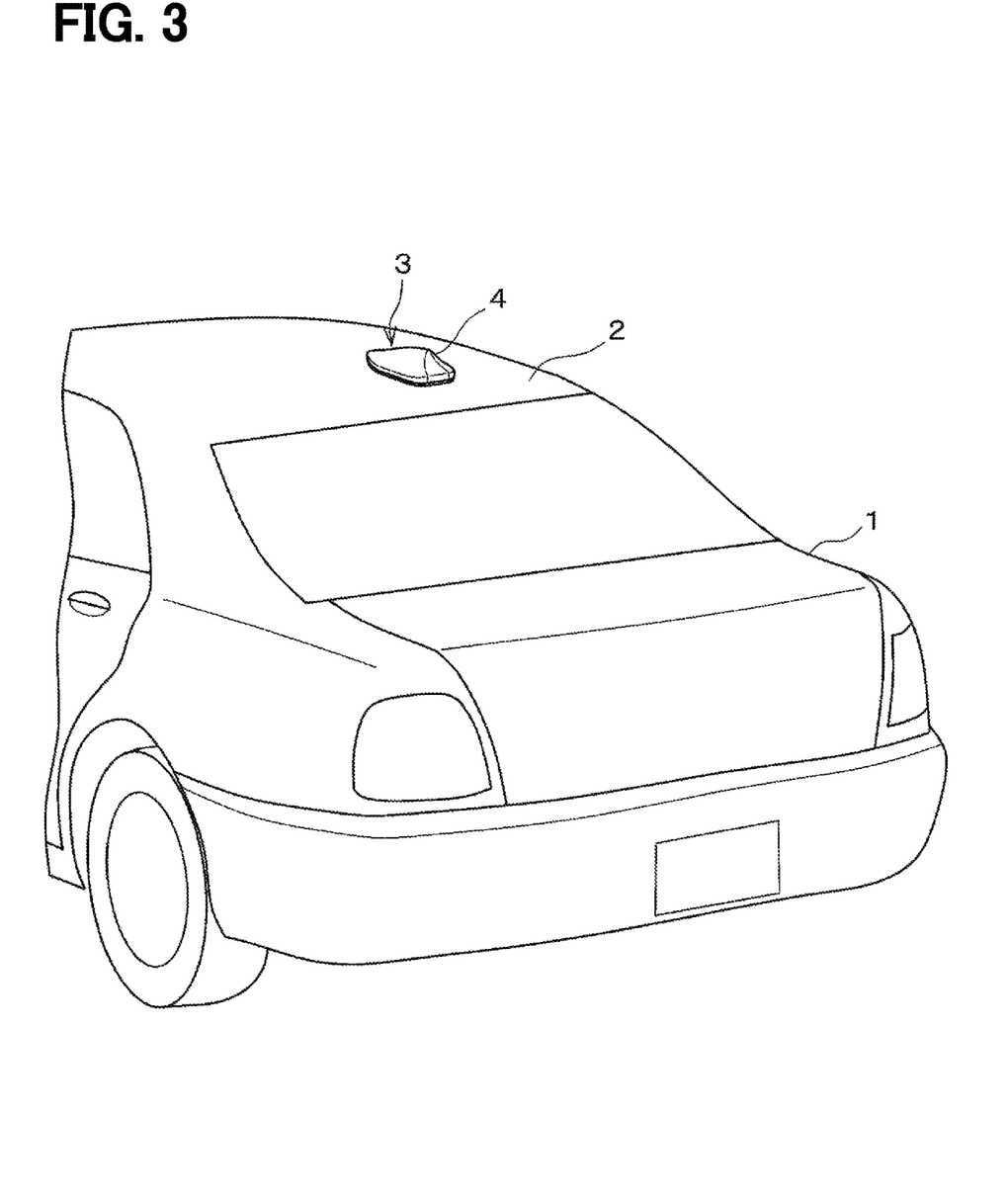
FIG. 3 is a perspective view showing a rear part of the vehicle.

As shown in FIG. 3, a vehicle communication device 3 is mounted on an outer surface of a rear end of a roof 2 of a vehicle 1. A housing 4 of the vehicle communication device 3 has a streamlined so-called shark fin shape from a front to a rear of the vehicle for the purpose of reducing air resistance during vehicle travel as much as possible and improving an appearance design.

Figure 1:
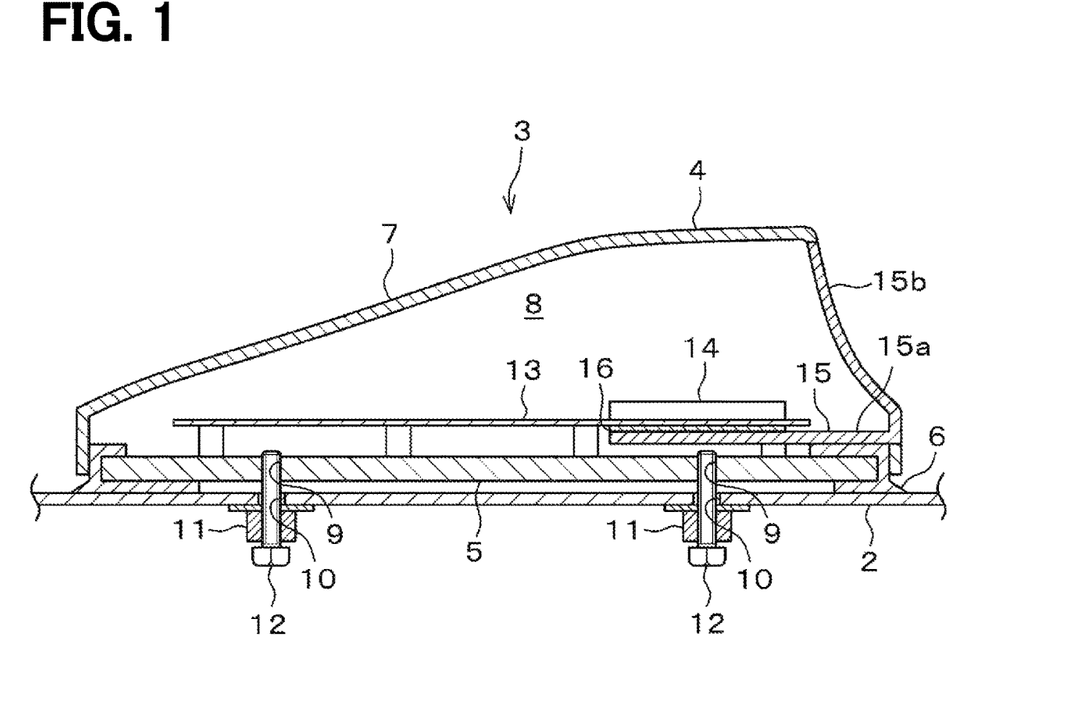
FIG. 1 is a vertical sectional side view showing a vehicle communication device according to a first embodiment.

As shown in FIG. 1, the housing 4 is configured by attaching a cover 7 to a base 6 integrated with a main plate 5, and has an airtight closed space 8 formed inside. The cover 7 is made of a resin having radio wave transmission and insulating properties such as acrylic resin.

A screw portion 9 is formed on the main plate 5, and a hole portion 10 is formed on the roof 2. In a state where the vehicle communication device 3 mounted on the roof 2 at a predetermined position on the roof 2, the vehicle communication device 3 is fixed to the roof 2 by penetrating the bolt 12 through the hole portion 10 of the roof 2 through a cylindrical spacer 11 and then screwing the bolt 12 into the screw portion 9.

The wiring board 13 is arranged in the closed space 8 formed inside the housing 4. A socket (not shown) connected to the wiring board 13 is attached to a lower surface of the main plate 5, and a socket connected to a cable from a communication device (not shown) is connected to the socket connected to the wiring board 13 so that the vehicle communication device 3 and the communication device are electrically connected.

For example, a communication module 14 that constitutes a vehicle to vehicle communication circuit is mounted on the wiring board 13. The communication module 14 corresponds to the communication unit. Since the communication module 14 has a heat resistant temperature of, for example, 85° C., it is necessary to dissipate heat so as not to exceed the heat resistant temperature. Therefore, it is necessary to dissipate the heat of the communication module 14 by arranging the heat dissipation component in the closed space 8, but when the heat dissipation component is arranged in the housing 4, the vehicle communication device 3 becomes large and the design becomes poor.

Further, the antenna is arranged after the heat dissipation component is arranged, and it is necessary to properly arrange the antenna while avoiding the heat dissipation component in order to secure an antenna characteristics. The number of parts of the vehicle communication device 3 increases and the structure becomes complicated, therefore, it leads to an increase in the overall size.

Under these circumstances, a metal heat dissipation component 15 is provided in the communication module 14 so as to be in a heat-conducting state, and a part of the heat dissipation component 15 is exposed to the outside of the housing 4 to function as an antenna.

That is, the heat dissipation component 15 has an L shape including a heat transfer portion 15a and a heat dissipation portion 15b. The heat transfer portion 15a of the heat dissipation component 15 is arranged on a back surface of the wiring board 13 so as to face a mounting position of the communication module 14. For example, a heat dissipation gel 16 having an insulating property is interposed between the wiring board 13 and the heat dissipation component 15, and the communication module 14 and the heat dissipation component 15 are in a heat conductive state.

Figure 2:
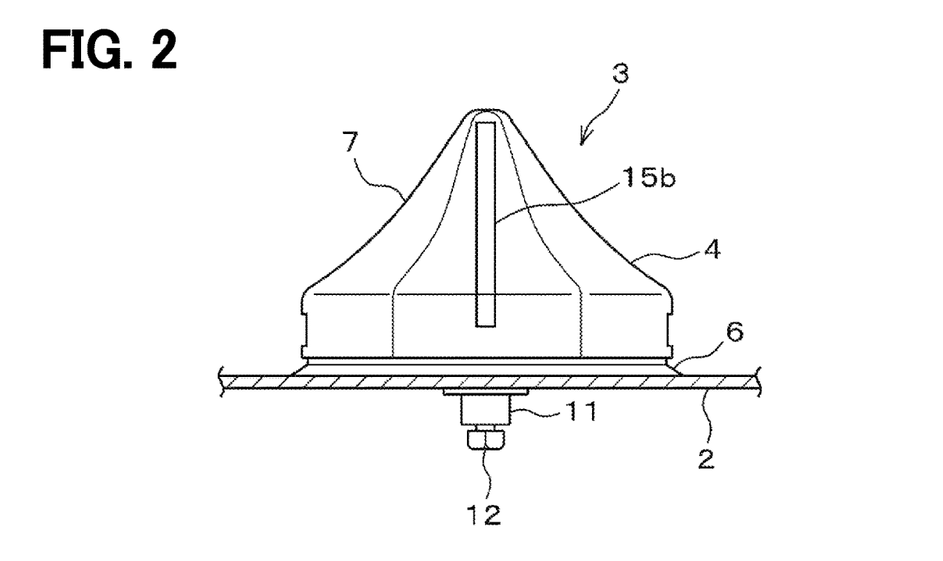
FIG. 2 is a rear view of a vehicle communication device.

As shown in FIG. 2, the heat dissipation portion 15b of the heat dissipation component 15 is exposed to the outside in a linear shape along a height direction of the rear surface of the housing 4. The heat dissipation portion 15b is provided flush with the outer surface of the cover 7 from the viewpoint of design, but may be projected. The outer surface of the cover 7 corresponds to the wall surface.

In the present embodiment, the heat dissipation component 15 is electrically connected to the communication module 14 to function as an antenna for vehicle to vehicle communication. Therefore, in the heat dissipation portion 15b, an effective dimension of the housing 4 in the height direction is set to be a length capable of transmitting and receiving 720 MHz radio waves, which is the center frequency of 715 to 725 MHz, which is the frequency band used by the vehicle to vehicle communication system.

In the operating state of the communication module 14 of the vehicle communication device 3, the communication module 14 generates heat and becomes hot. However, since the heat dissipation portion 15b of the heat dissipation component 15 provided in the communication module 14 in the heat conduction state is exposed to the outside of the housing 4, the heat generated by the communication module 14 is efficiently radiated from the heat dissipation portion 15b to the outside.

By the way, as described above, although the heat dissipation portion 15b of the heat dissipation component 15 is exposed to the outside of the housing 4, the roof 2 becomes hot when the vehicle 1 is exposed to sunlight. Therefore, the temperature inside of the housing 4 will rise, and there is concern that the temperature of the communication module 14 will rise.

However, in the present embodiment, since the heat dissipation portion 15b is provided along the height direction of the outer surface of the housing 4, it is possible to improve the heat dissipation efficiency of the heat dissipation portion 15b and suppress the temperature rise of the communication module 14.

According to the embodiment described above, the following effects can be achieved.

Since the communication module 14 and the heat dissipation component 15 are provided in the heat conductive state, and the heat dissipation portion 15b of the heat dissipation component 15 is exposed to the outside in the linear shape along the height direction of the housing 4, the heat dissipation component 15 can function as an antenna. As a result, it is possible to reduce the overall size while arranging the heat dissipation component 15.

Figure 4:
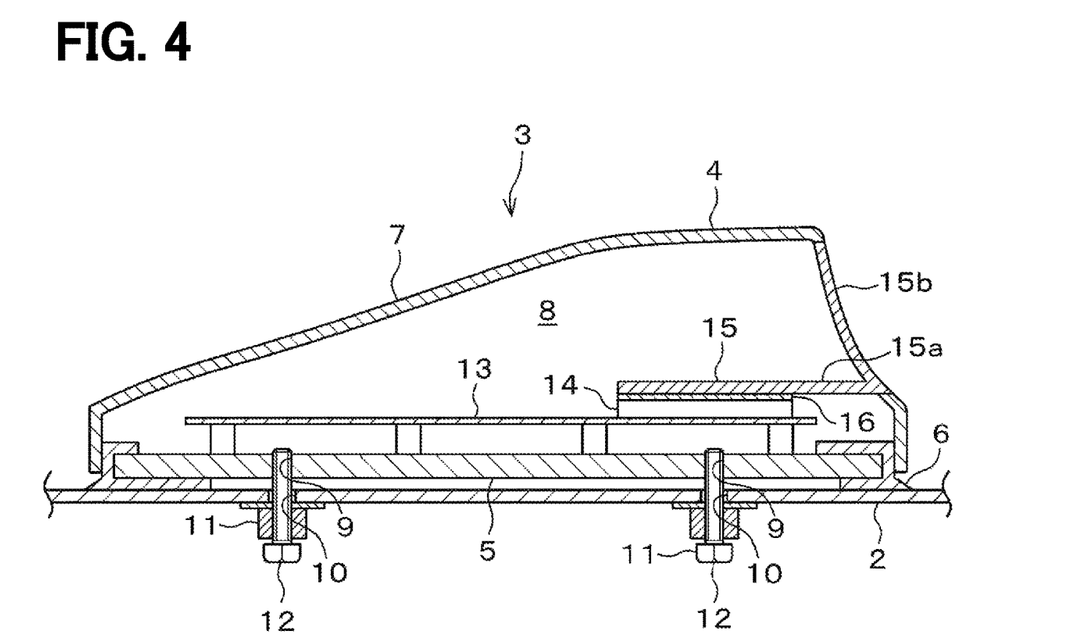
FIG. 4 is a vertical sectional side view (No. 1) of a vehicle communication device showing a modified form.

As shown in FIG. 4, the heat transfer portion 15a of the heat dissipation component 15 may be provided in a heat conductive state via the upper surface side of the communication module 14 and the heat dissipation gel 16. The communication module 14 may be provided on both the upper surface and the lower surface side so as to be in a heat conductive state.

Figure 5:
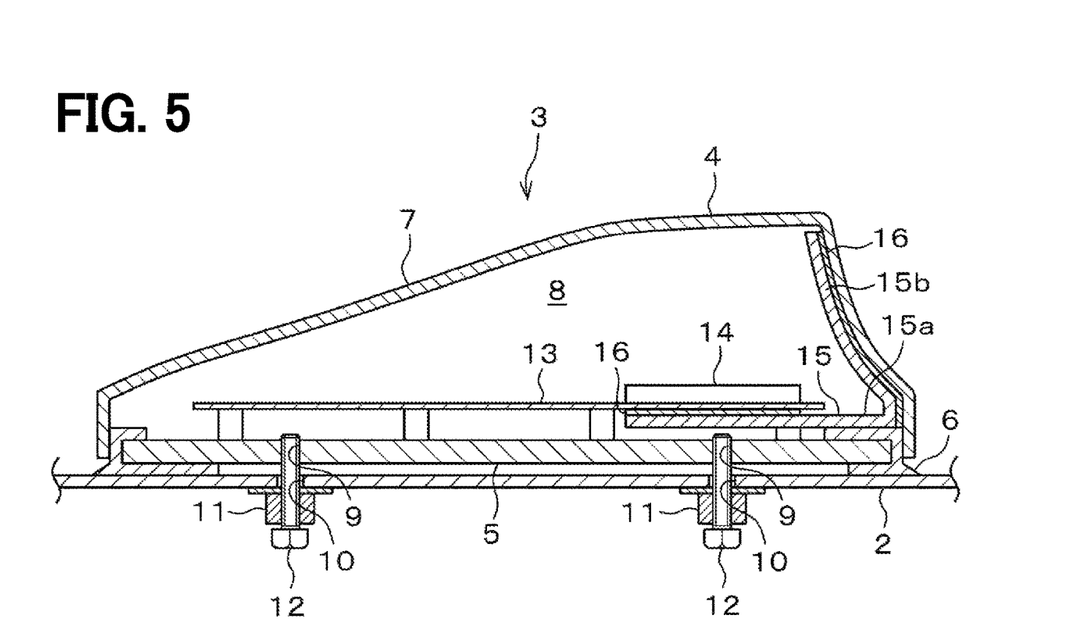
FIG. 5 is a vertical sectional side view (No. 2) of a vehicle communication device showing a modified form.

Further, as shown in FIG. 5, the heat dissipation portion 15b of the heat dissipation component 15 may be provided in a heat conductive state via the heat dissipation gel 16 along the height direction of the inner surface of the housing 4. In this case, the inner surface of the housing 4 corresponds to the wall surface.

Instead of functioning the heat dissipation component 15 as an antenna for vehicle to vehicle communication, it may be made to function as an antenna for road to vehicle communication or mobile phone system communication. For example, since the frequency used by the antenna for connecting to a mobile phone system is 700 MHz to 960 MHz, the length of the heat dissipation portion 15b that functions as an antenna is appropriately set depending on the communication target.

A director or a reflector may be arranged in the housing 4.

Second Embodiment

Figure 6:
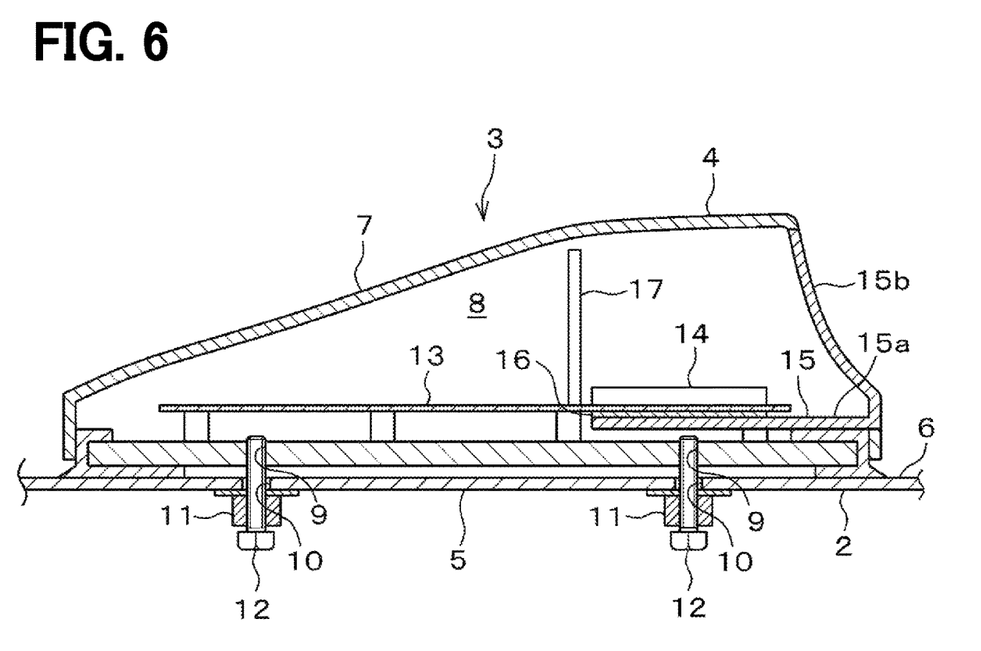
FIG. 6 is a vertical sectional side view showing a vehicle communication device according to a second embodiment.

A second embodiment will be described with reference to FIGS. 6 and 7. In the second embodiment, the heat dissipation component 15 functions as an antenna element of the communication module 14.

The heat dissipation component 15 is not electrically connected to the communication module 14 for vehicle to vehicle communication, and does not function as an antenna as in the first embodiment.

That is, the antenna 17 for vehicle to vehicle communication is arranged in the housing 4 at a position in the housing 4 so as to be on a straight line in the front-rear direction of the housing 4 with respect to the heat dissipation portion 15b of the heat dissipation component 15, and the heat dissipation portion 15b is configured to function as an element of the antenna of the communication module 14.

When the heat dissipation component 15 also functions as a director, the length of the heat dissipation component 15 in the height direction is set shorter than that of the antenna 17, and when it also functions as a reflector, the length of the heat dissipation component 15 in the height direction is set longer than that of the antenna 17. When the heat dissipation component 15 functions as a director, the directivity toward the rear of the vehicle can be increased, and when the heat dissipation component 15 functions as a reflector, the directivity toward the front of the vehicle can be increased. A typical value of the distance between the heat dissipation component 15 and the antenna 17 in the front-rear direction is λ/4 when the wavelength of the radio wave is λ, but other values may be selected.

According to such an embodiment, since the heat dissipation component 15 functions as an element of an antenna such as a reflector or a director, it is possible to reduce the size of the entire device while arranging the heat dissipation component 15.

Figure 7:
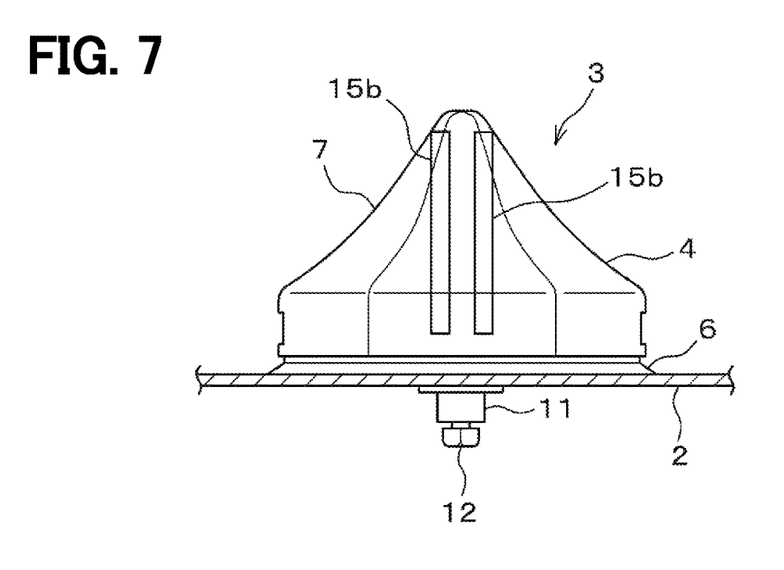
FIG. 7 is a rear view of a vehicle communication device showing a modified form.

As shown in FIG. 7, a plurality of heat dissipation portions 15b may be provided along the height direction of the rear surface of the housing 4. According to such a configuration, it is possible to control the characteristics of the reflector and the director when the heat dissipation component 15 functions as the reflector and the director.

Third Embodiment

A third embodiment will be described with reference to FIGS. 8 and 9. The third embodiment is characterized in that the heat dissipation performance of the heat dissipation portion 15b of the heat dissipation component 15 is improved.

Figure 8:
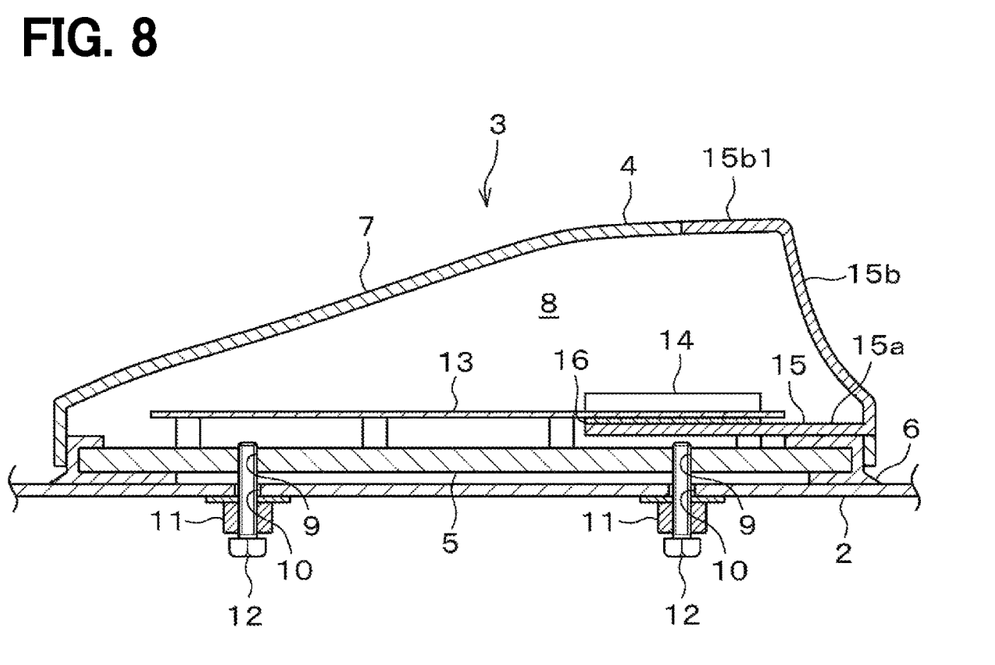
FIG. 8 is a vertical sectional side view showing a vehicle communication device according to a third embodiment.
Figure 9:
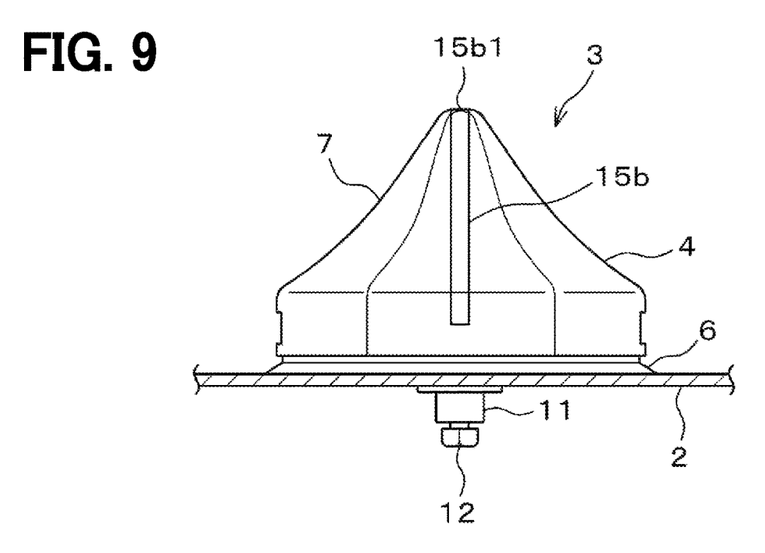
FIG. 9 is a rear view of a vehicle communication device.

As shown in FIGS. 8 and 9, the heat dissipation portion 15b of the heat dissipation component 15 has a sub heat dissipation part 15b1 whose upper end is bent forward of the housing 4 and extends along the upper surface of the housing 4.

According to such an embodiment, since the heat dissipation portion 15b of the heat dissipation component 15 has the sub heat dissipation part 15b1 extending along the front of the housing 4, the heat dissipation performance of the heat dissipation component 15 is improved without impairing the design.

Fourth Embodiment

A fourth embodiment will be described with reference to FIG. 10. The fourth embodiment is characterized in that the heat dissipation portion 15b of the heat dissipation component 15 is formed in a surface shape.

Figure 10:
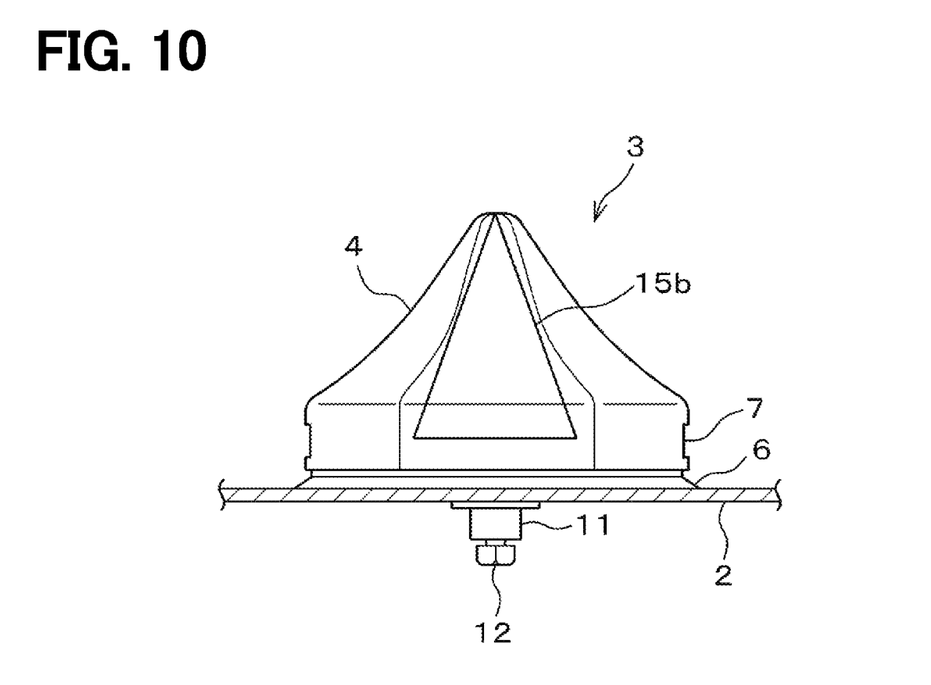
FIG. 10 is a rear view showing a vehicle communication device according to a fourth embodiment.

As shown in FIG. 10, the heat dissipation portion 15b of the heat dissipation component 15 is formed on the rear surface of the housing 4 in, for example, a triangular surface shape.

According to such an embodiment, since the heat dissipation portion 15b of the heat dissipation component 15 is formed in a surface shape on the rear surface of the housing 4, the heat dissipation performance of the heat dissipation portion 15b can be improved without impairing the design.

The surface shape of the heat dissipation portion 15b is not limited to a triangle, and may be polygonal or circular, or may be formed from a plurality of surface shapes.

Fifth Embodiment

A fifth embodiment will be described with reference to FIG. 11. The fifth embodiment is characterized in that the heat dissipation portion 15b of the heat dissipation component 15 is formed in a frame shape.

Figure 11:
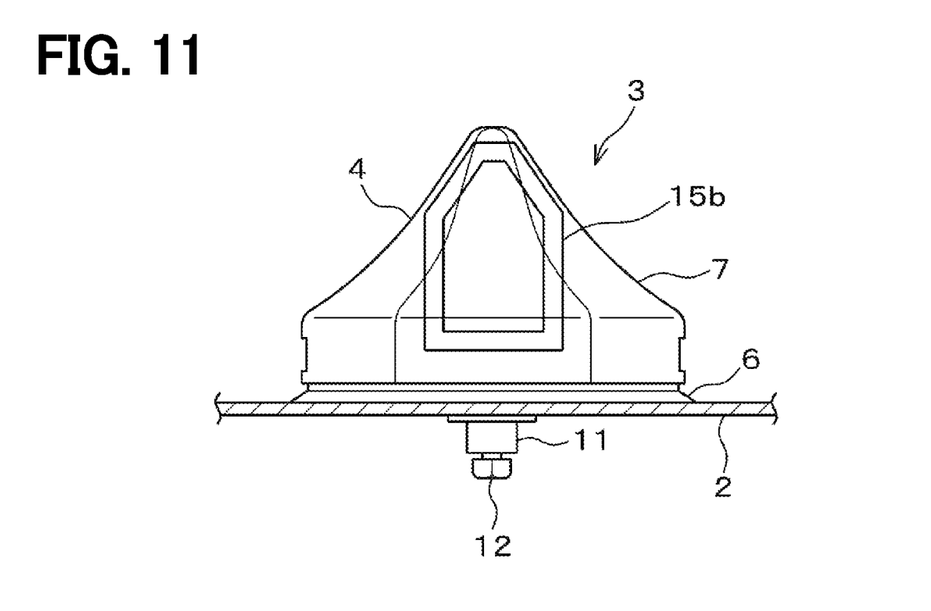
FIG. 11 is a rear view showing a vehicle communication device according to a fifth embodiment.

As shown in FIG. 11, the heat dissipation portion 15b of the heat dissipation component 15 is formed on the rear surface of the housing 4 in a polygonal frame shape along the height direction.

According to such an embodiment, since the heat dissipation portion 15b of the heat dissipation component 15 is formed in a polygonal frame shape on the rear surface of the housing 4, it is possible to increase a transmission of radio waves toward the rearward radiated from the antenna 17.

The heat dissipation portion 15b is not limited to the polygonal frame shape, and may be a circular frame shape or may be formed from a plurality of frame shapes.

Sixth Embodiment

A sixth embodiment will be described with reference to FIG. 12. The sixth embodiment is characterized in that a balancer for a reflector or a director is arranged.

Figure 12:
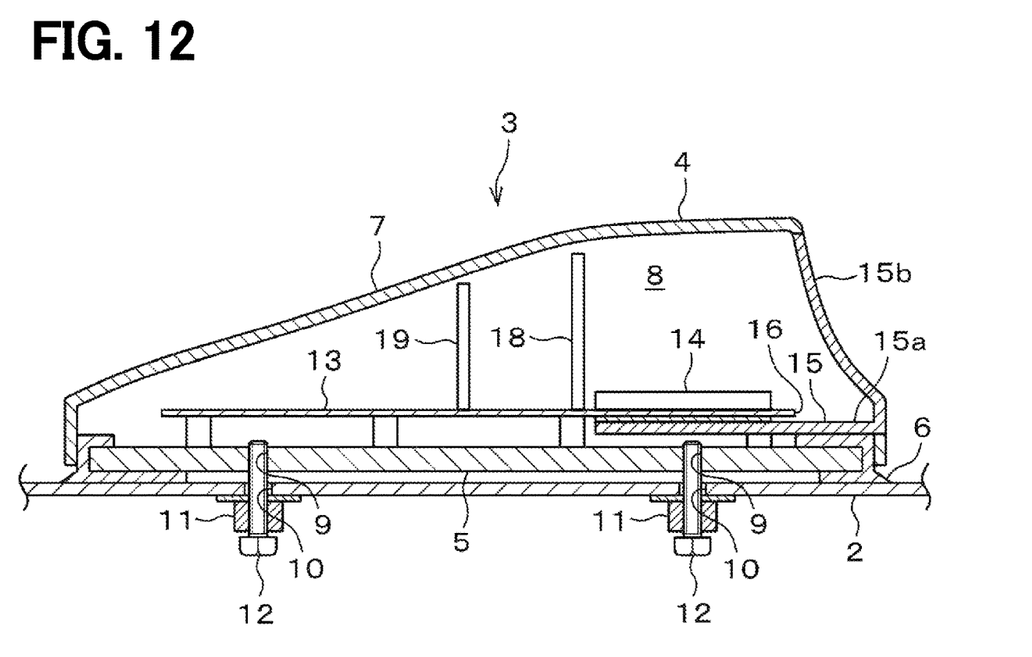
FIG. 12 is a vertical sectional side view showing a vehicle communication device according to a sixth embodiment.

When the heat dissipation component 15 functions as an antenna as shown in FIG. 12, the director 18 is arranged in the housing 4, and then the balancer 19 is arranged at a position in front of the director 18. The balancer 19 is provided to adjust the dissipation characteristics of radio waves radiated from the heat dissipation portion 15b of the heat dissipation component 15 and passed through the director 18.

According to such an embodiment, since the balancer 19 is arranged in the housing 4 with respect to the director 18, the characteristics of the director 18 can be adjusted.

When the heat dissipation component 15 functions as a reflector, an antenna is arranged in the housing 4, and the balancer 19 is arranged at a position in front of the antenna.

Seventh Embodiment

Figure 13:
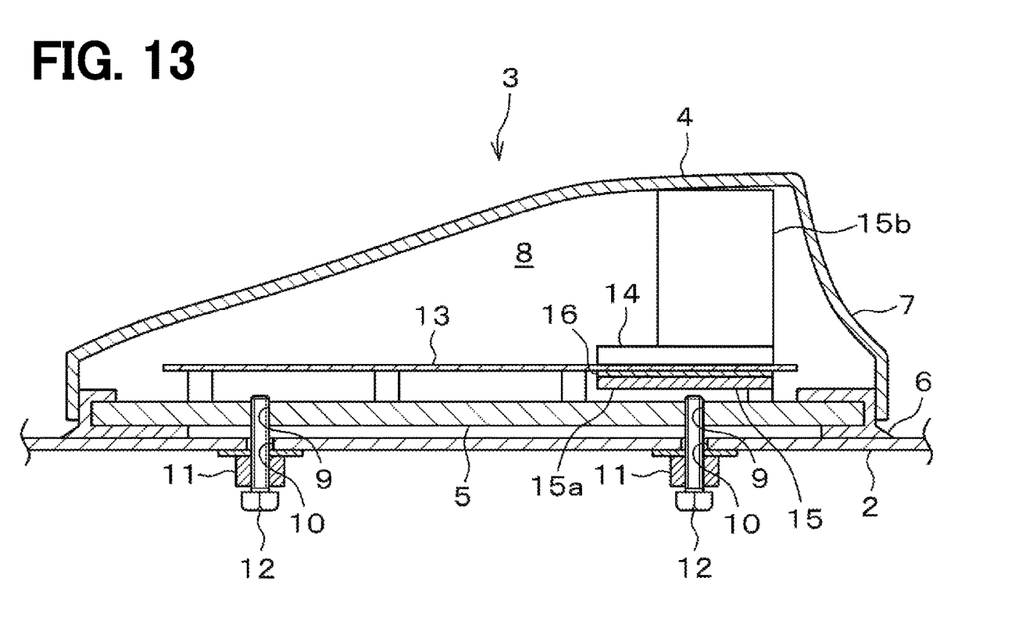
FIG. 13 is a vertical sectional side view showing a vehicle communication device according to a seventh embodiment.

A seventh embodiment will be described with reference to FIGS. 13 and 14. The seventh embodiment is characterized in that the heat dissipation portion 15b of the heat dissipation component 15 is provided on the side surface of the housing 4.

Figure 14:
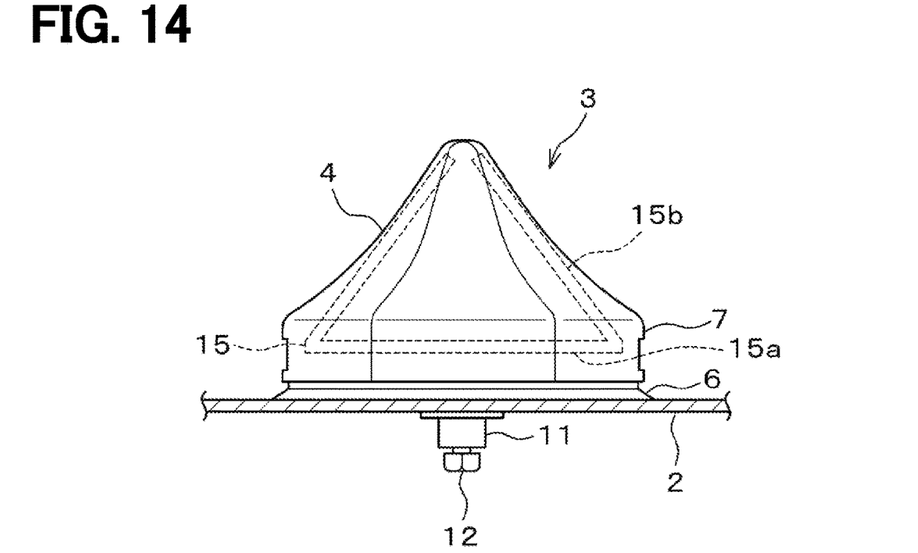
FIG. 14 is a rear view of a vehicle communication device.

As shown in FIG. 14, the heat dissipation portion 15b of the heat dissipation component 15 is exposed to the outside in a surface shape along the height direction of the side surface of the housing 4. In this case, the side surface of the housing 4 corresponds to the wall surface.

According to such an embodiment, since the heat dissipation portion 15b of the heat dissipation component 15 is provided so as to be exposed to the outside along the height direction of the side surface of the housing 4, the area of the heat dissipation portion 15b is significantly expanded, and the heat dissipation performance can be improved.

Eighth Embodiment

An eighth embodiment will be described with reference to FIG. 15. The eighth embodiment is characterized in that the rear surface of the housing 4 is formed to bulge rearward.

The shape of the housing 4 is being improved day by day to reduce air resistance and improve the appearance design, and it is expected that the shape of the housing 4 will change. In particular, it is expected that the rear surface of the housing 4 will be provided with a portion protruding rearward in order to reduce air resistance.

Figure 15:
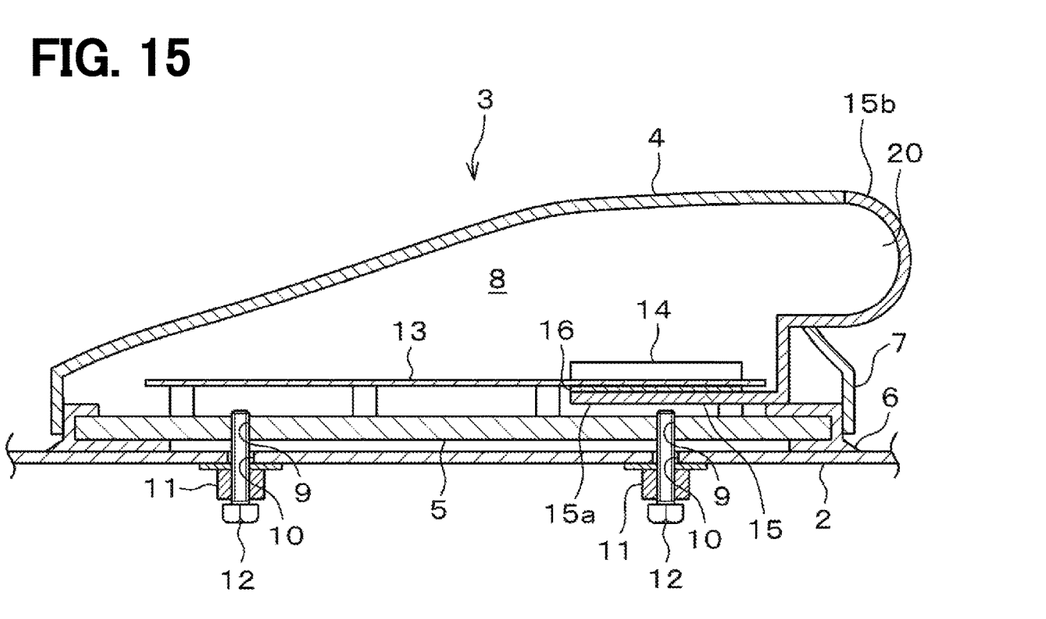
FIG. 15 is a vertical sectional side view showing a vehicle communication device according to a eight embodiment.

When a bulging portion 20 projecting rearward is formed on the rear surface of the housing 4 as shown in FIG. 15, the heat dissipation portion 15b of the heat dissipation component 15 is exposed to the outside along the height direction of the outer surface of the bulging portion 20.

According to such an embodiment, in a configuration in which the bulging portion 20 projecting rearward is provided on the rear surface of the housing 4, the dissipation portion 15b of the heat dissipation component 15 is provided along the height direction of the outer surface of the bulging portion 20. Therefore, even if the shape of the housing 4 changes, it is possible to maintain the heat dissipating performance of the heat dissipation component 15 in accordance with the change.

Ninth Embodiment

A ninth embodiment will be described with reference to FIG. 16. The ninth embodiment is characterized in that it is applied to a vehicle communication device of a type installed in a vehicle. An example of this type of vehicle communication device is a TCU (Telematics Communication Unit).

Figure 16:
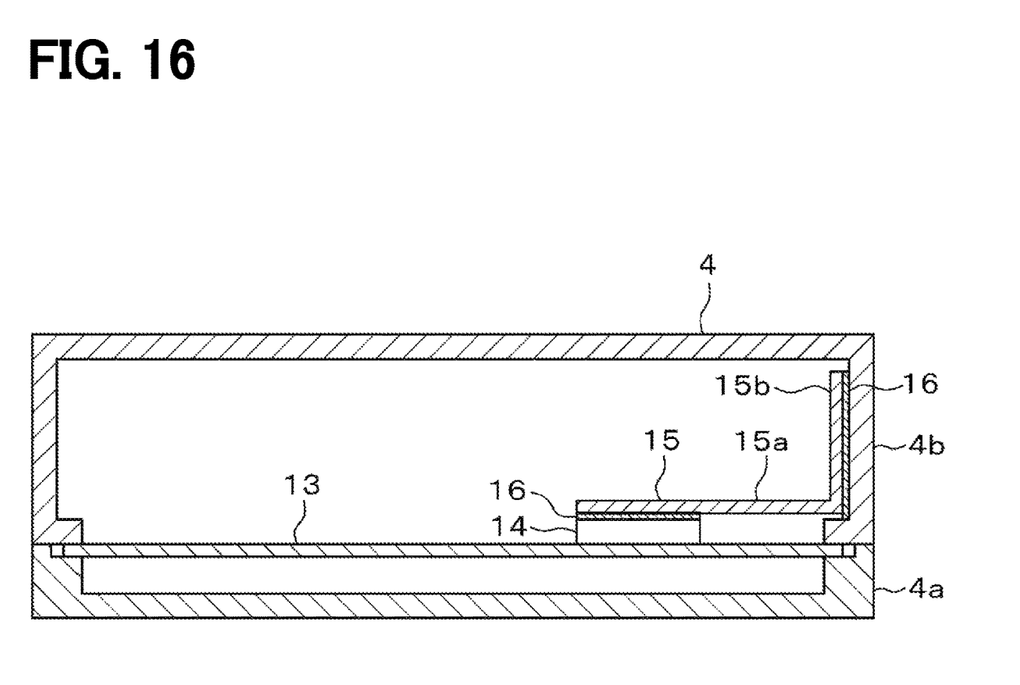
FIG. 16 is a vertical sectional side view showing a vehicle communication device according to a ninth embodiment.

As shown in FIG. 16, the housing 4 of the vehicle communication device 3 has a box shape in which an upper housing 4b is integrated with a lower housing 4a. The wiring board 13 is interposed between the lower housing 4a and the upper housing 4b in a positioned state. The vehicle communication device 3 is installed directly under the windshield in the instrument panel, for example, and is easily affected by sunlight through the windshield.

A communication module 14 is mounted on the wiring board 13, and a heat transfer portion 15a of a heat dissipation component 15 is provided on the communication module 14 in a heat conductive state via the heat dissipation gel 16. The heat dissipation portion 15b of the heat dissipation component 15 has a linear shape along the inner surface of the housing 4, and is provided on the inner surface of the housing 4 in a heat conductive state via the heat dissipation gel 16. The heat dissipation component 15 is electrically connected to the communication module 14, and the heat dissipation portion 15b functions as an antenna.

According to such an embodiment, the heat dissipation portion 15b of the heat dissipation component 15 that dissipates heat from the communication module 14 to the outside can function as an antenna, so that the entire size of the device can be reduced while arranging the heat dissipation component 15.

As in each of the above embodiments, the heat dissipation portion 15b of the heat dissipation component 15 may be exposed to the outside of the housing 4, or the heat dissipation portion 15b may be formed in a surface shape or a frame shape.

The heat dissipation portion 15b of the heat dissipation component 15 may function as an antenna element such as a director or a reflector.

OTHER EMBODIMENTS

By providing the heat dissipation portion 15b of the heat dissipation component 15 in a horizontal direction, it may function as an antenna or an element of the antenna.

The shape of the housing 4 in the first to eighth embodiments is not limited to the shark fin shape, and may be a box shape or a hemispherical shape.

A heat pipe may be used as the heat dissipation component, or a component obtained by plating a high thermal conductive resin with metal may be used.

The number of antenna elements is not limited to one, and a plurality of antenna elements may be arranged.

Although the present disclosure has been described in accordance with the embodiments, it is understood that the present disclosure is not limited to such embodiments or structures. The present disclosure encompasses various modifications and variations within the scope of equivalents. In addition, while the various combinations and configurations, which are preferred, other combinations and configurations, including more, less or only a single element, are also within the spirit and scope of the present disclosure.

What is claimed is:

1. A communication device for vehicle, comprising:
   a housing installed in a vehicle;
   a communication unit housed in the housing and having an antenna;
   a heat dissipation component provided in a heat conductive state with respect to the communication unit; and
   a balancer configured to adjust a characteristics of an antenna element, wherein
   the heat dissipation component has a heat dissipation portion configured to function as the antenna element.

2. The communication device for vehicle according to claim 1, wherein
   the heat dissipation portion is provided along a wall surface of the housing.

3. The communication device for vehicle according to claim 2, wherein the heat dissipation portion is provided along a height direction of the wall surface.

4. The communication device for vehicle according to claim 1, wherein
the heat dissipation portion has a linear shape.

5. The communication device for vehicle according to claim 1, wherein
the heat dissipation portion has a surface shape.

6. The communication device for vehicle according to claim 1, wherein
the heat dissipation portion has a frame shape.

7. The communication device for vehicle according to claim 1, wherein
the housing has a bulging portion protruding rearward on a rear surface, and
the heat dissipation portion is provided along a height direction of a wall surface of the bulging portion.

8. The communication device for vehicle according to claim 1, wherein
the heat dissipation portion has a sub heat dissipation part along an upper surface of the housing.

9. The communication device for vehicle according to claim 1, wherein
a director is arranged in the housing, and the balancer is arranged at a position in front of the director.

* * * * *